US008551381B2

(12) United States Patent
Kaps et al.

(10) Patent No.: US 8,551,381 B2
(45) Date of Patent: Oct. 8, 2013

(54) FIBER COMPOSITE COMPONENT AND METHOD FOR THE PRODUCTION OF A FIBER COMPOSITE COMPONENT

(75) Inventors: Robert Kaps, Braunschweig (DE); Jan Schoppmeier, Wennigsen (DE); Lars Herbeck, Fedlheim (DE); Daniel Schmidt, Göttingen (DE); Axel Herrmann, Stade (DE)

(73) Assignee: Airbus Deutschland GmbH, Hamburg (DE)

( * ) Notice: Subject to any disclaimer, the term of this patent is extended or adjusted under 35 U.S.C. 154(b) by 772 days.

(21) Appl. No.: 11/909,733

(22) PCT Filed: Feb. 21, 2006

(86) PCT No.: PCT/DE2006/000337
§ 371 (c)(1),
(2), (4) Date: Oct. 2, 2007

(87) PCT Pub. No.: WO2006/089534
PCT Pub. Date: Aug. 31, 2006

(65) Prior Publication Data
US 2008/0274322 A1 Nov. 6, 2008

(30) Foreign Application Priority Data

Feb. 21, 2005 (DE) .......................... 10 2005 008 252
Jan. 16, 2006 (DE) .......................... 10 2006 002 198

(51) Int. Cl.
*B29C 70/44* (2006.01)
(52) U.S. Cl.
USPC .......................... 264/258; 264/257

(58) Field of Classification Search
USPC ................................... 264/258, 274, 273, 257
See application file for complete search history.

(56) References Cited

U.S. PATENT DOCUMENTS

| 4,268,468 | A | * | 5/1981 | Esper et al. ................... 264/131 |
| 5,080,851 | A | * | 1/1992 | Flonc et al. ................... 264/258 |
| 5,667,881 | A | | 9/1997 | Rasmussen et al. |
| 6,017,484 | A | * | 1/2000 | Hale ............................ 264/510 |
| 6,048,488 | A | * | 4/2000 | Fink et al. .................... 264/510 |
| 6,447,880 | B1 | * | 9/2002 | Coppens ...................... 428/174 |
| 2004/0067705 | A1 | * | 4/2004 | Ton-That et al. ............... 442/65 |
| 2004/0219855 | A1 | * | 11/2004 | Tsotsis .......................... 442/364 |
| 2004/0265406 | A1 | * | 12/2004 | Lorenz et al. ................. 425/110 |
| 2006/0110599 | A1 | | 5/2006 | Honma et al. |

FOREIGN PATENT DOCUMENTS

| DE | 1090849 | 10/1960 |
| DE | 3045517 | 7/1982 |
| DE | 69529396 | 7/1996 |

(Continued)

*Primary Examiner* — Amjad Abraham
(74) *Attorney, Agent, or Firm* — Whitham, Curtis, Christofferson & Cook, P.C.

(57) ABSTRACT

A fiber composite component comprising at least two, first and second partial elements bordering one another, each having a fiber structure and different matrix systems which respectively embed the fiber structure and cure differently from a liquid state is produced by liquifying the matrix system of the first partial element so that it either penetrates irregularly into the region of the bordering second partial element or leaves an unwetted region in the first partial element adjacent the second partial element, and subsequently liquifying the matrix system of the second partial element so that it can be cured abutting the irregular boundary surfaces of the matrix system of the first partial element. The intermeshing or interlocking of the matrix systems with one another and the fibers increase shear strength.

11 Claims, 14 Drawing Sheets

(56) References Cited

FOREIGN PATENT DOCUMENTS

| | | |
|---|---|---|
| DE | 19915083 | 4/2000 |
| EP | 0158528 | 10/1985 |
| EP | 0159169 | 10/1985 |
| EP | 0 637 510 | 8/1994 |
| EP | 1321282 | 6/2003 |
| EP | 1400341 | 3/2004 |
| JP | 56-128232 | 9/1981 |
| JP | 57047619 | 3/1982 |
| JP | 57-207057 | 12/1982 |
| JP | 04-146930 | 5/1992 |
| JP | 07-97465 | 4/1995 |
| JP | 08-073629 | 3/1996 |
| WO | WO03/092986 | 11/2003 |
| WO | WO 2004-060658 | 7/2004 |

* cited by examiner

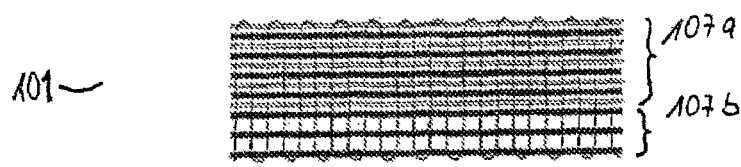
Fig. 11
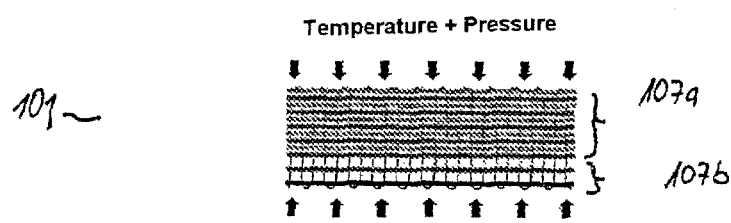
a)
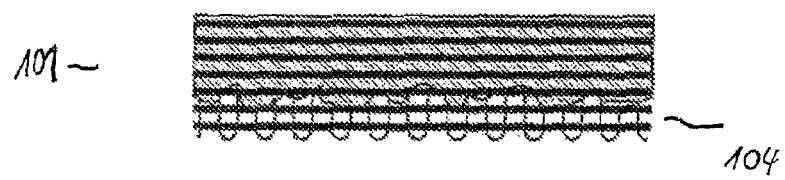
b)
Fig. 12

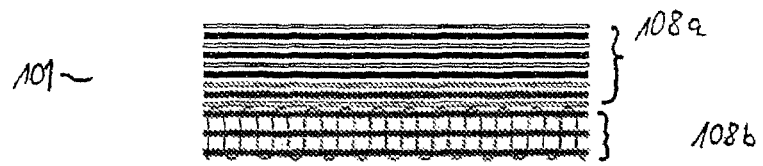
Fig. 13
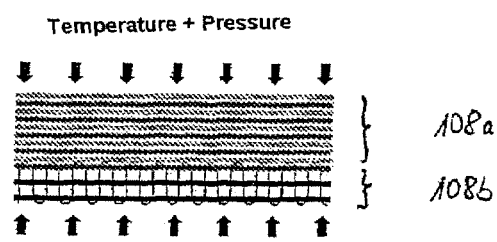
a)
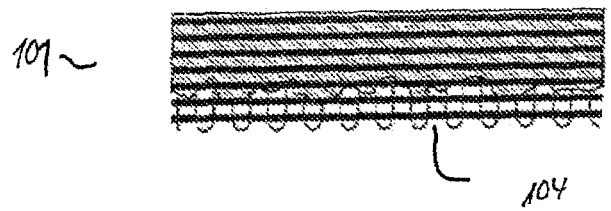
b)
Fig. 14

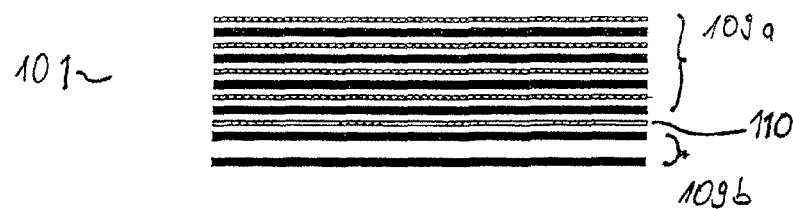
Fig. 15
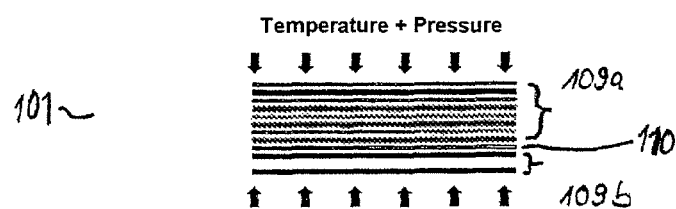
a)
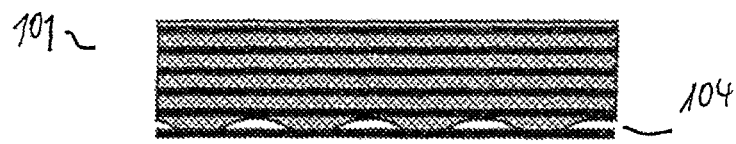
b)
Fig. 16

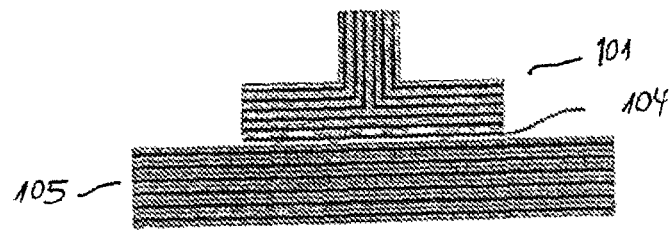
a)
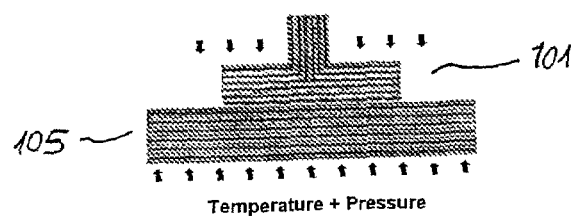
b)
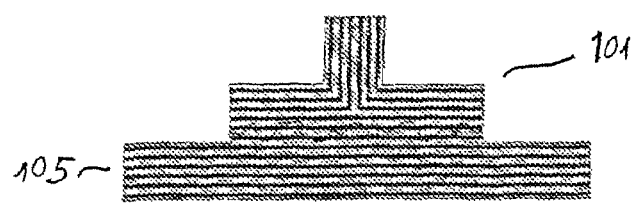
c)
Fig. 17

FIBER COMPOSITE COMPONENT AND METHOD FOR THE PRODUCTION OF A FIBER COMPOSITE COMPONENT

The invention relates to a method for the production of a fiber composite component comprising at least two, first and second partial elements bordering one another, each having a fiber structure and different matrix systems which respectively embed the fiber structure and cure differently from a liquid state.

The invention also relates to a fiber composite component comprising at least first and second partial elements bordering one another, each having a fiber structure and differently cured matrix systems respectively embedding the fiber structure.

It is known to make up fiber composite components from various partial elements which have different fiber structures, but in particular also different matrix systems, in order to satisfy the different requirements for the partial elements. In conventional technology, the partial elements are produced separately from one another and joined together to form the component by means of an adhesive and/or screw joint. The joining together of the partial elements leads to the disadvantage that the joint only has a possibly required high shear strength when an elaborate type of joint is used, which significantly increases the weight of the fiber composite component.

It is known from DE 199 15 083 C1 and EP 1 400 341 A1 to arrange different preforms, that is to say partial fiber-structure elements, in relation to one another and impregnate them with a binder (matrix system) and cure them—if appropriate in a vacuum—together. However, it is evident that the same matrix systems are used for this.

U.S. Pat. No. 5,667,881 discloses a joint between a thermoplastic material and a thermosetting material, which is produced by the two plastics being able to mix somewhat in the liquid or plastified state at the boundary surfaces between them, in order in this way to form a kind of dispersion with one another. Such a method is restricted to the use of plastics that are miscible with one another and therefore only has a limited field of applications.

The present invention is based on the object of permitting the production of a fiber composite component of the type mentioned at the beginning which has increased stability of the joint between the partial elements, can be produced at low cost and is not restricted to specific combinations of plastics.

This object is achieved by a fiber composite component of the type mentioned at the beginning which is characterized in that the matrix system of the first partial element extends with regular boundary surfaces into the region of the second partial element and the matrix system of the second partial element adjoins the matrix system of the first partial element within the second partial element with complementary boundary surfaces.

In an alternative embodiment, a fiber composite component according to the invention of the type mentioned at the beginning is characterized in that the matrix system of the first partial element extends with irregular boundary surfaces into the region of the second partial element and forms there a mixing region with the irregular boundary surfaces and the matrix system of the second partial element adjoins the mixing region within the second partial element with complementary boundary surfaces.

The aforementioned object is also achieved in a first embodiment by a method of the type mentioned at the beginning in that first the matrix system of the first partial element is liquefied and thereby penetrates irregularly into the region of the bordering second partial element, in that subsequently the matrix system of the second partial element is liquefied and in that the matrix systems are cured.

The method according to the invention consequently provides that the matrix system of the first partial element is first liquefied, while the fiber structure of the second partial element is still dry, i.e. a possibly already present matrix system of the second partial element is not yet liquefied or the fiber structure of the second partial element has not yet been provided with a matrix system. This allows the matrix system of the first partial element to penetrate irregularly in liquid form into the region of the second partial element, so that during the subsequent liquefying of the matrix system of the second partial element (by heating or by injection of the liquid binder) an irregular boundary surface is formed between the matrix systems, by which the cured matrix systems are "intermeshed" or "interlocked" with one another. This accomplishes a joint between the partial elements which has a significantly increased shear strength on account of the "intermeshing" or "interlocking" of the matrix systems. It is characteristic of the method according to the invention that the intermeshing or interlocking of the matrix systems takes place exclusively in the region of one of the partial elements, a "backflow" into the other partial element being negligible and less than 2%, preferably less than 1% of the volume effecting the intermeshing or interlocking in the partial element.

In one embodiment of the invention, the partial elements have one matrix system of a thermosetting material and one matrix system of a thermoplastic material. In this case, the thermoplastic material may preferably be present in the fiber structure of the first partial element, which is consequently formed as a thermoplastic prepreg or the fiber structure of which may contain thermoplastic fibers. By heating up, the thermoplastic material can be liquefied and so penetrate into the region of the second partial element, preferably into the fiber structure of the second partial element. The thermosetting binder can then be injected, for example, into the fiber structure of the second element. An irregular boundary surface thereby forms between the two liquid binders, so that the later cured matrix structures border one another with an irregular boundary surface and have partially penetrated one into the other.

The curing is preferably performed by appropriate temperature control, for example the thermosetting binder being made to cure by an increase in temperature—and possibly by a positive pressure—, while the thermoplastic binder subsequently cures during the cooling.

In another embodiment of the invention, a thermosetting material may be present, for example on a prepreg, said thermosetting material liquefying at a relatively low temperature (for example 80° C.) and extending into the region of a bordering thermoplastic prepreg or thermoplastic comingling hybrid having intermediate spaces. With a further increase in temperature, the thermoplastic material liquefies, so that in the partial region of the thermoplastic material there forms a mixing region, in which the thermoplastic fibers of the comingling hybrid or the thermoplastic component of the prepreg are/is liquefied within the penetrated thermoplastic material and so form(s) thermoplastic inclusions during the curing of the thermosetting material. However, essential for the increase in the bonding force is the spatial intermeshing of the matrices concerned by the thermosetting material that has penetrated irregularly into the second partial region. The mixing region is located exclusively in the second partial region of the arrangement, "exclusively" also meaning here that any backflow of thermoplastic material into the first partial region of the thermosetting material there may be is minor, making up less than 2%, preferably less than 1%, in terms of volume.

Preferably, the method steps for the production of the fiber composite component up to the curing of the matrix systems are carried out in the once closed mold, resulting in a considerable rationalization of the production method.

In another embodiment, the method of the type mentioned at the beginning is characterized in that the first partial element is consolidated with a fiber structure unwetted by the matrix system while leaving a transitional region, intended for adjoining to the second partial element, and in that subsequently the second partial element is consolidated once the matrix system of the second partial element has penetrated into the transitional region of the first partial element.

The first partial element or component of a subassembly is consequently consolidated separately in such a way that a dry fiber region without matrix material remains in the transition to the later subassembly, i.e. the second partial element. The consolidation, for example by matrix liquefaction or matrix injection and curing, may also be performed before the assembly with the second partial element. As a result, the later transitional zone from one matrix system of the first partial element to the other matrix system of the second partial element is established within the first partial element.

The second component is consequently not thermally stressed when the matrix of the first partial element is liquefied, since the transitional region is already created in the first partial element before the first and second partial elements are assembled to form a subassembly.

The consolidating of the first and/or second partial elements may be performed, for example, by liquefying and subsequently curing the respective matrix system.

However, it is also conceivable for the consolidating of the first and second partial elements to be performed by injection of matrix material and subsequent curing of the respective matrix system.

It is particularly advantageous if the transitional region is formed with an irregular thickness distribution over the surface area of the transitional region. This is achieved by the fiber layers of the transitional region having in their surface area both dry fiber regions and regions that are permeated by matrix material of the first partial element. The irregular boundary surface that accordingly forms as a result of this, by way of the fiber layers of the transitional region, has the advantage that improved intermeshing and interlocking of the two partial elements is achieved in the transitional region. An integral bond between the two matrix regions is established by means of the fibers.

In an advantageous embodiment, the first partial element is made up of at least two layers, which are joined to one another for example by sewing. A first layer of the first partial element is in this case a fiber structure which is provided with a matrix system and a second layer is a fiber structure which is joined to the first layer, is not provided with a matrix system and forms the transitional region. During the consolidation of the matrix system, for example by liquefaction of a thermoplastic material, the matrix material flows partially into the second layer of the first partial system, so that during the curing of the matrix material a boundary layer forms in the second layer.

A thermoplastic-comingling hybrid or a thermoplastic prepreg may be used, for example, as the first layer of this two-layered first partial element.

In another advantageous embodiment of the first partial element, a second layer, formed by fiber layers sewn to one another, by a laid fiber fabric or by a preform fiber layer, is applied to the first layer to produce the first partial element. Subsequently, the matrix system of the first partial element is consolidated while leaving the transitional region, in that for example a thermoplastic material of the first layer is liquefied, so that this material flows into the second layer. During the curing of the thermoplastic material, a boundary layer then forms in the second layer of the first partial element.

Another advantageous embodiment of the first partial element is produced by laying a thermoplastic film between the first and second layers of the first partial element before the consolidation of the matrix system of the first partial element and curing of the matrix system by means of introducing heat. During the introduction of heat, the thermoplastic film melts and penetrates partially into the second layer to form an uneven transitional region.

The thermoplastic film may, for example, be punched or perforated.

The perforation of the thermoplastic film is retained to the greatest extent in the second layer and a boundary layer with holes forms. This allows the matrix system of the second partial element to flow into these holes and, when it cures, additionally mesh with the matrix system of the first partial element. Consequently, the two matrix systems create an uneven boundary surface.

A fiber composite component produced by the method described can be used, for example, for stringer-stiffened fuselage or wing shells of an aircraft. This involves laying the shell elements from an epoxy/carbon prepreg, while the stringers are produced from a carbon-fiber material with a thermoplastic matrix by the method described above. The stringers are then completely consolidated apart from the contact regions of the stringer foot to the prepreg shell and can be finely adapted to contours of the shell, for example spherical contours, by hot working. During the heating up of the sealed shell component with the stringers, the still dry region of the stringer feet is impregnated with excess resin of the prepreg and so forms a load-bearing connection of the stringers to the shell.

It is obvious that the method can also be used correspondingly for the production of fiber composite components for other fields of application.

The invention is explained in more detail below on the basis of exemplary embodiments represented in the drawing, in which:

FIG. 1 shows a neighboring arrangement of fiber structures of two neighboring partial elements of a fiber composite component;

FIG. 2 seta shows the application temperature and pressure to the arrangement according to FIG. 1 for the melting of a thermoplastic component in the fiber structure of the first partial element;

FIG. 3 schematically shows the penetration of thermoplastic material of the first partial element into the second partial element;

FIG. 4 schematically shows a subsequent injection of thermosetting resin;

Figure 10:
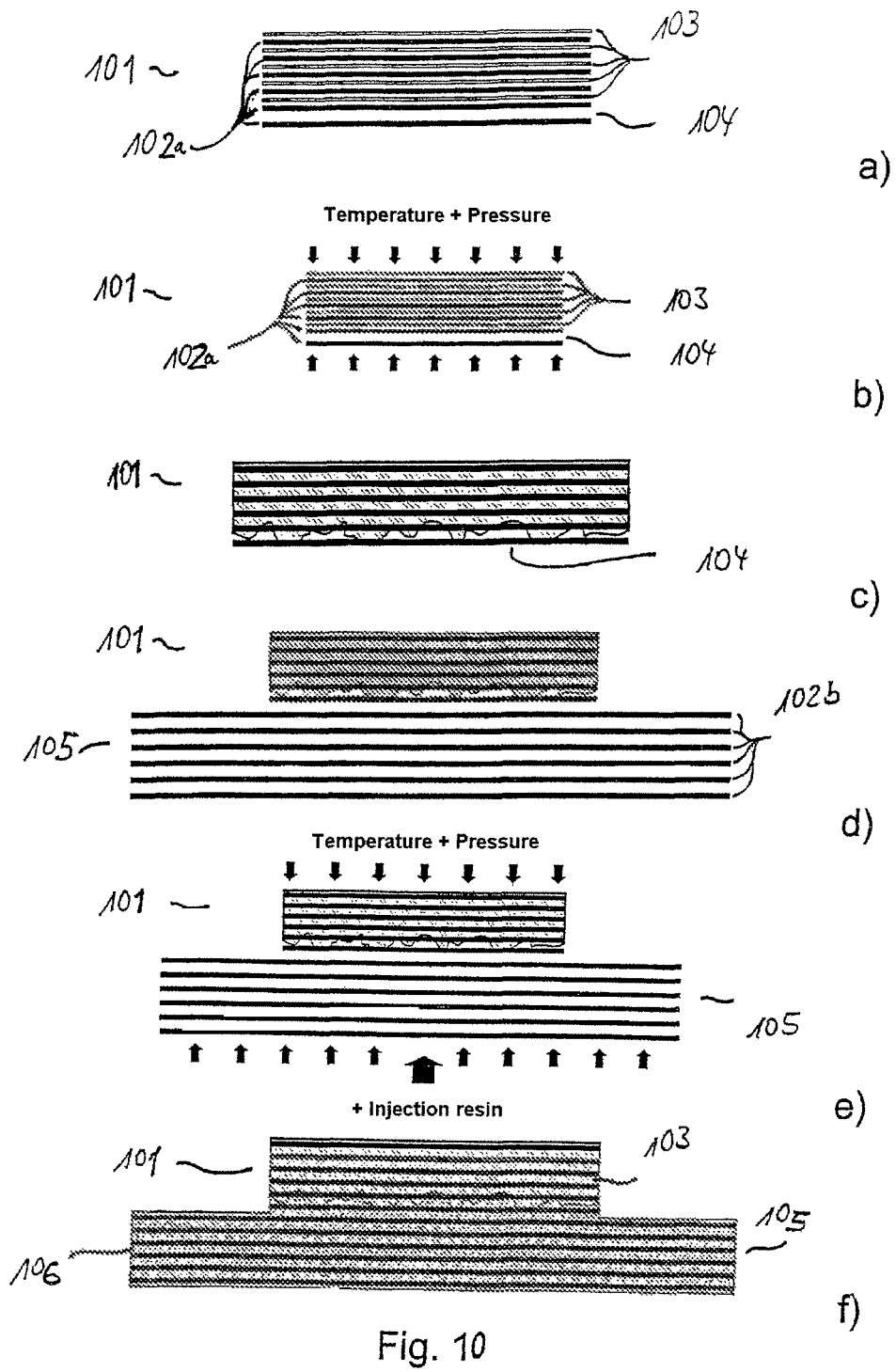

FIGS. 10a) to f) show a diagram of the method for the production of a fiber composite component with cross-sectional views of a first partial element and a second partial element, forming the fiber composite component;

FIG. 11 shows a diagram of a first embodiment of the first partial element as a cross-sectional view;

FIGS. 12a) and b) show a diagram of the consolidation of the matrix system of the first partial element from FIG. 11;

FIG. 13 shows a diagram of a second, other embodiment of the first partial element as a cross-sectional view;

FIGS. 14a) and b) show a diagram of the consolidation of the matrix system of the first partial element from FIG. 13;

FIG. 15 shows a diagram of a third embodiment of the first partial element as a cross-sectional view;

FIGS. 16a) and b) show a diagram of the method for the consolidation of the matrix system of the first partial element from FIG. 15;

FIGS. 17a) to c) show a diagram of the production of stringer-stiffened fuselage or wing shells.

Figure 1:
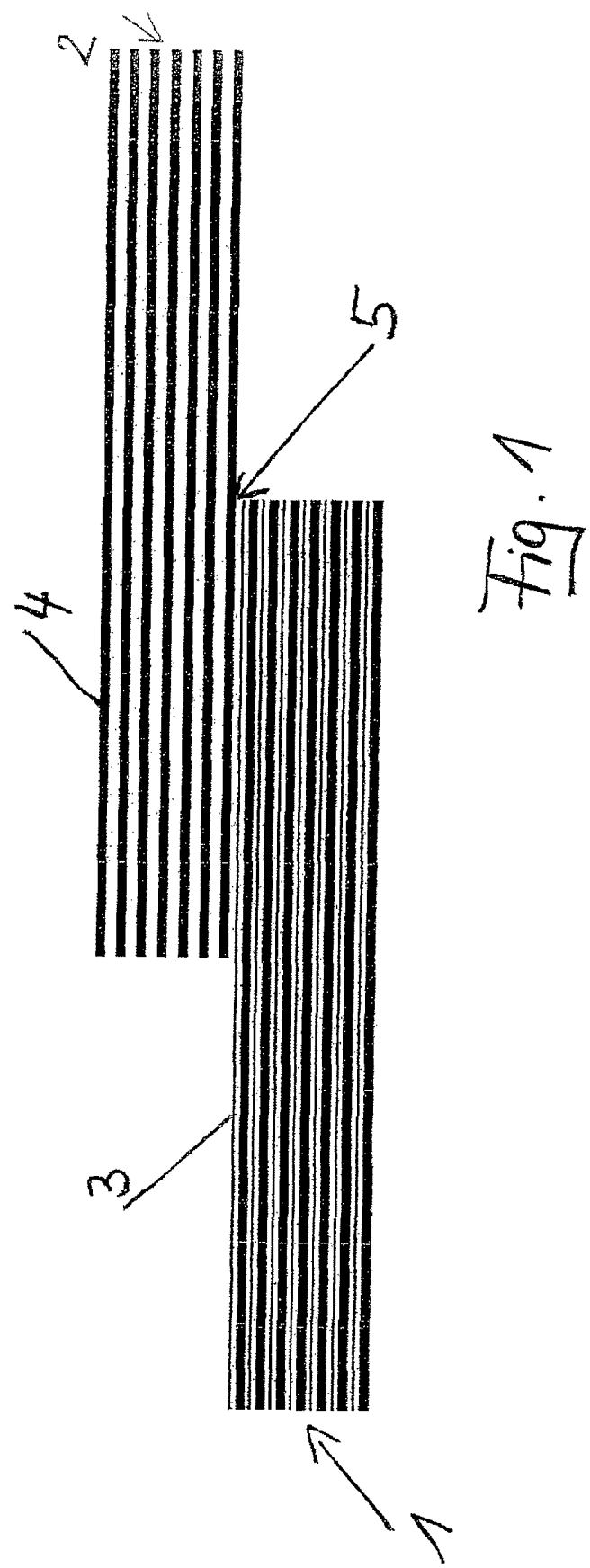

FIG. 1 schematically shows a first partial element 1 and a second partial element 2 of a fiber composite component to be produced. The first partial element 1 has a fiber structure 3 and the second partial element 2 has a fiber structure 4, which are schematically represented in the form of layers of woven fabric laid one on top of the other. The two partial elements are arranged overlapping one another and consequently form a common boundary surface 5.

In the exemplary embodiment represented, the fiber structure 3 of the first partial element 1 contains thermoplastic fibers (comingling hybrid).

Figure 2:
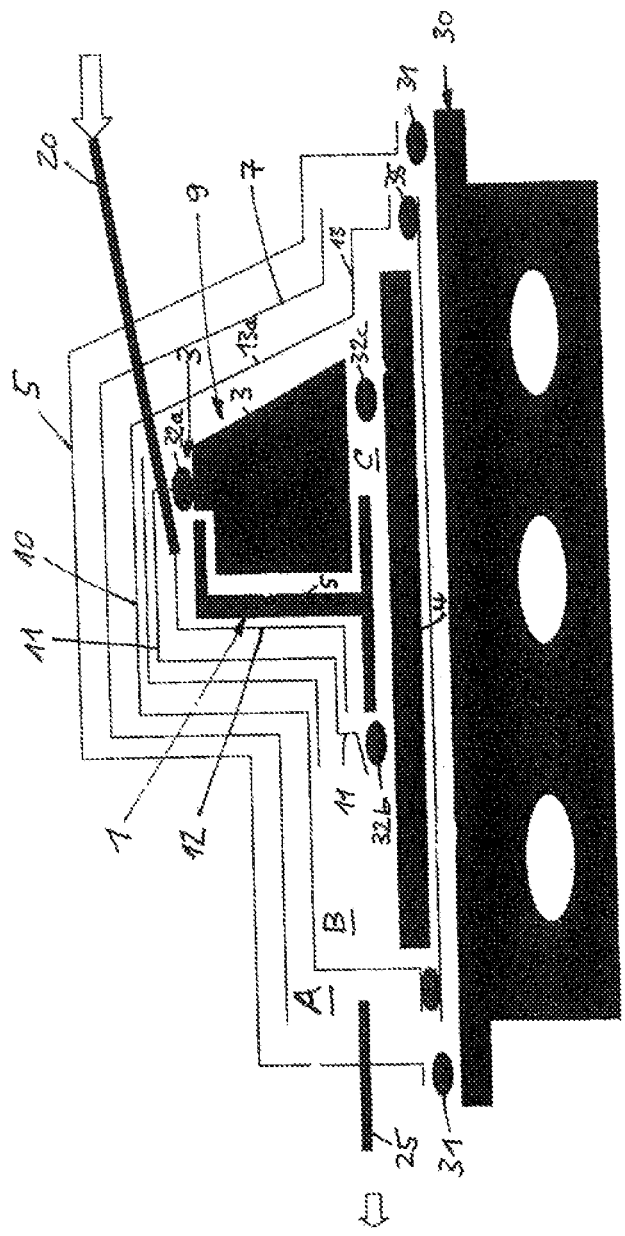

FIG. 2 schematically shows by a seal 6 surrounding the arrangement that the arrangement according to FIG. 1 is placed in a mold and sealed off from the outside, so that an elevated temperature and a modified pressure (elevated pressure or negative pressure) can be exerted on the arrangement within the mold 6.

Figure 3:
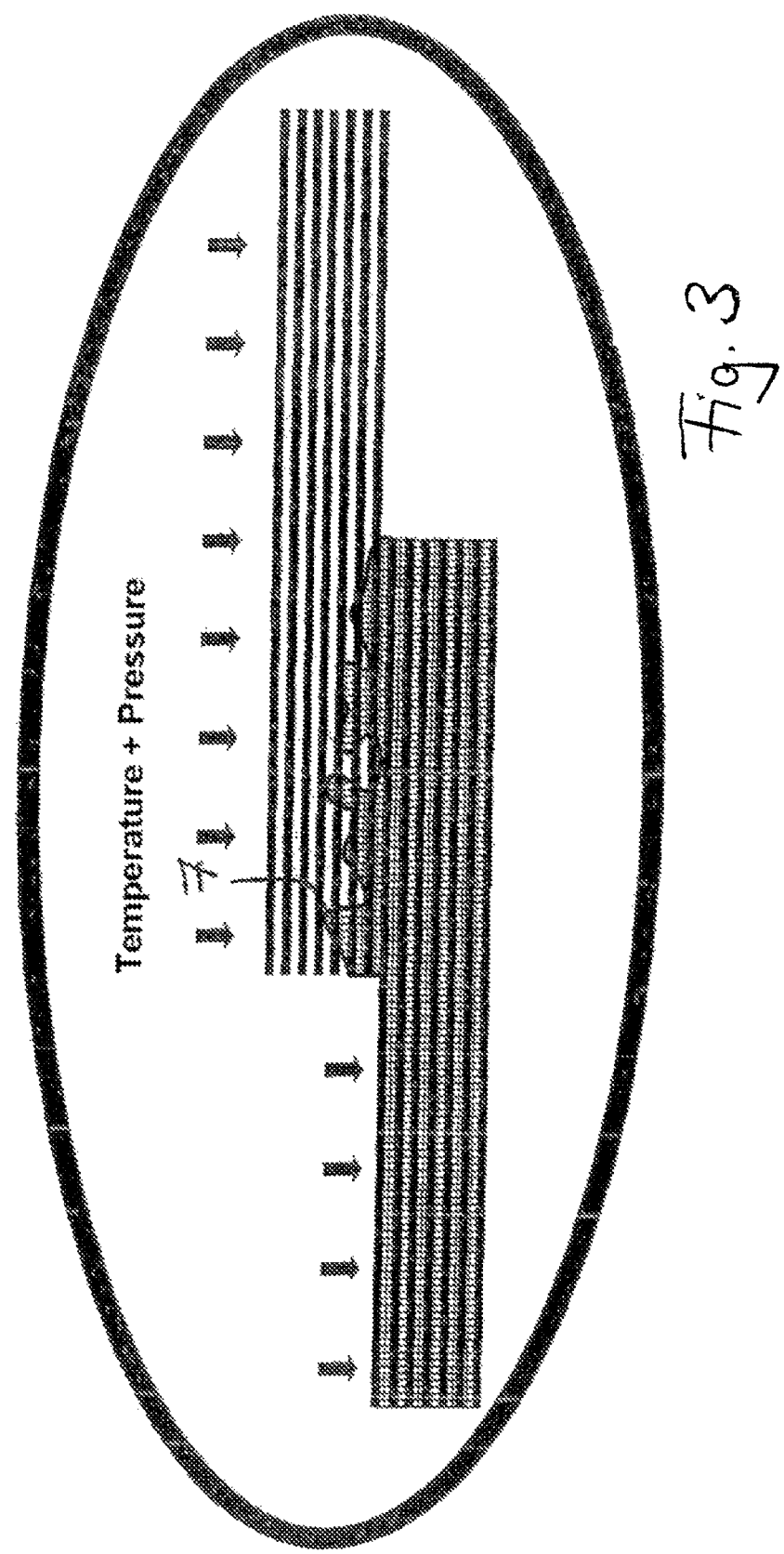

An elevated temperature allows the thermoplastic fibers in the fiber structure 3 of the first partial element 1, which is otherwise formed by carbon fibers, to be made to melt, so that a thermoplastic liquid binder is created. Since the fiber structure 4 of the second partial element 2 is formed as a dry carbon-fiber prepreg, the binder penetrates irregularly into the region of the second partial element 2, preferably into the fiber structure 4 of the second partial element 2, in the way illustrated in FIG. 3 by capillary action, and if applicable by the effect of a positive pressure within the mold 6.

Figure 4:
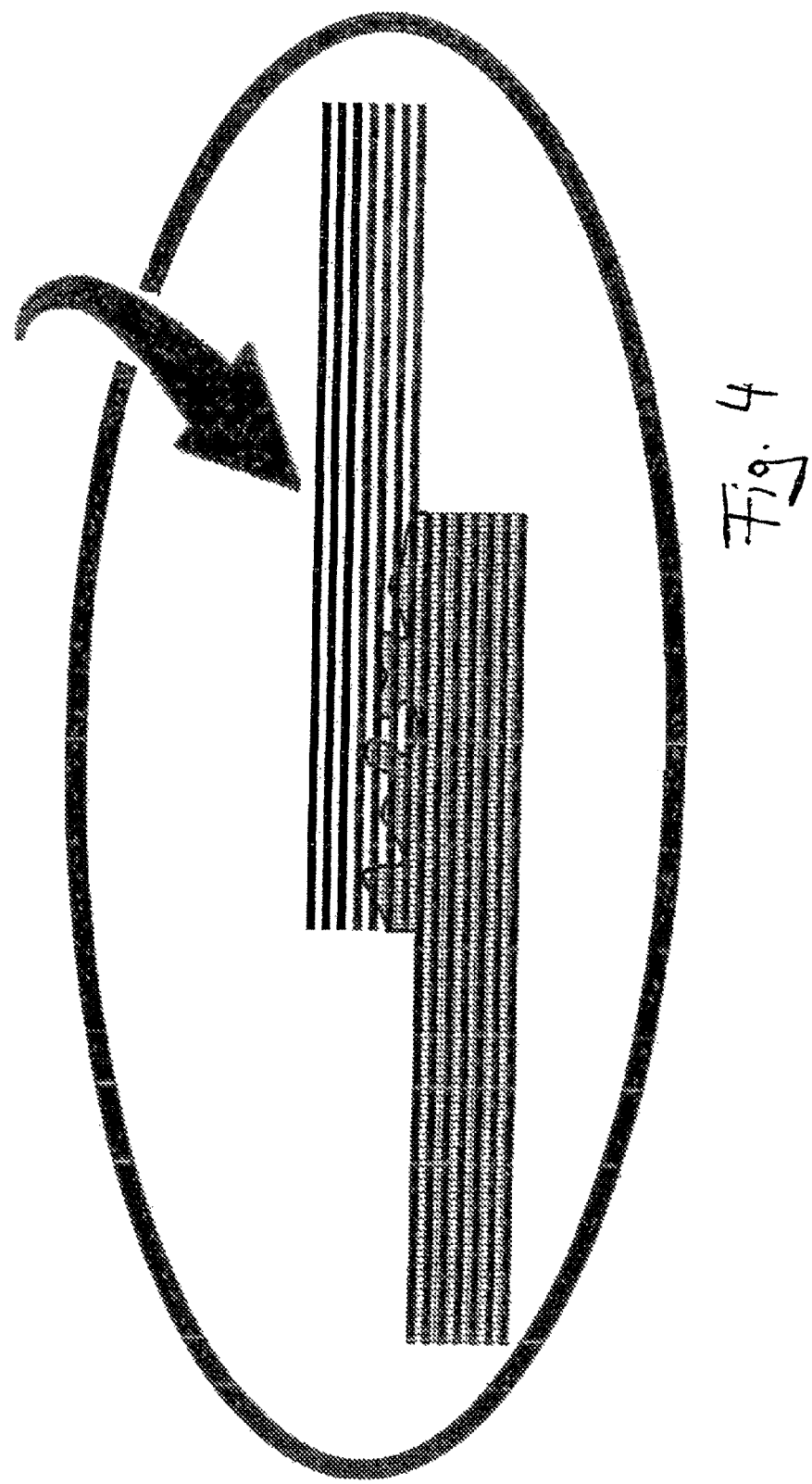

With the binder of the first partial element 1 already solidified, according to FIG. 4 a thermosetting binder (for example epoxy resin) is then forced into the fiber structure 4 of the second partial element 2, as schematically illustrated by an arrow. The two binders consequently form with respect to one another an irregular boundary line 7, which only runs in the region of the second partial element 2 on account of the binder that has penetrated into the fiber structure 4 of the second partial element 2.

Figure 5:
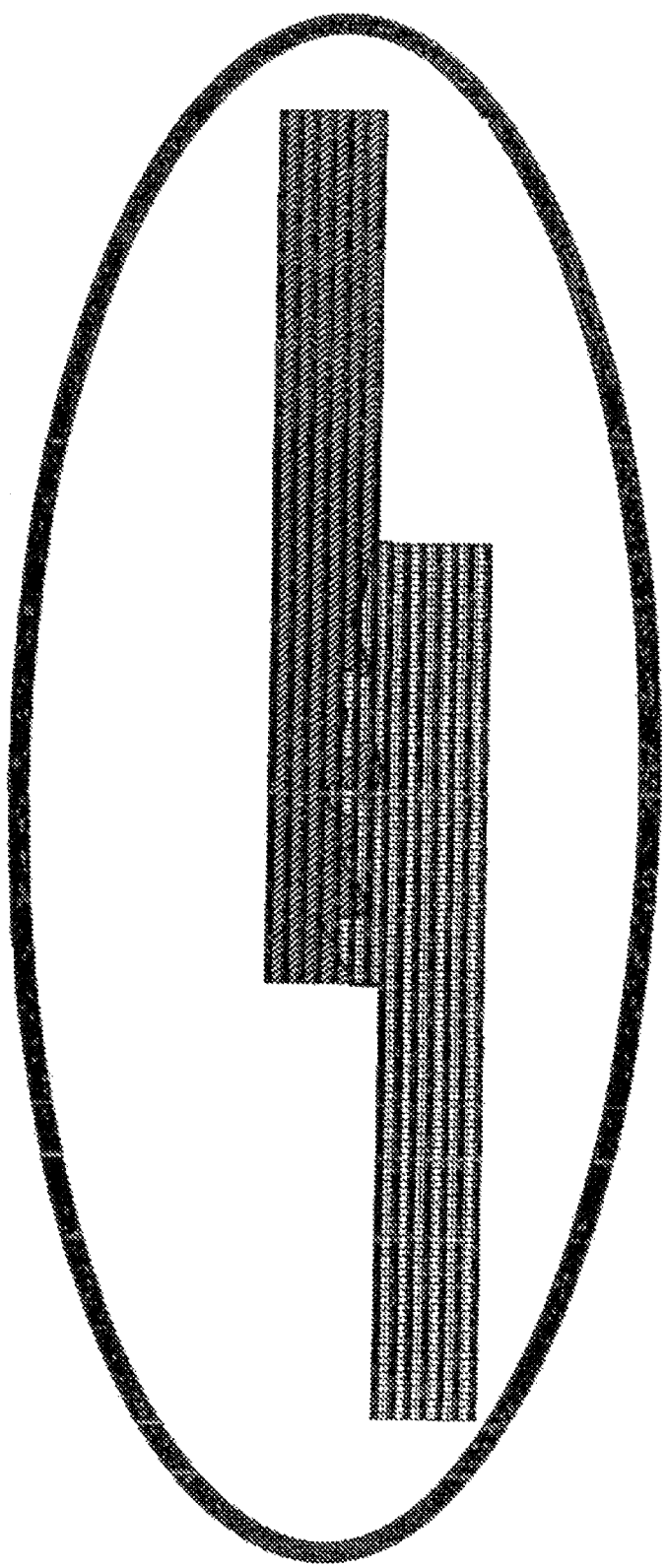
FIG. 5 shows the curing of the injected thermosetting resin.
Figure 6:
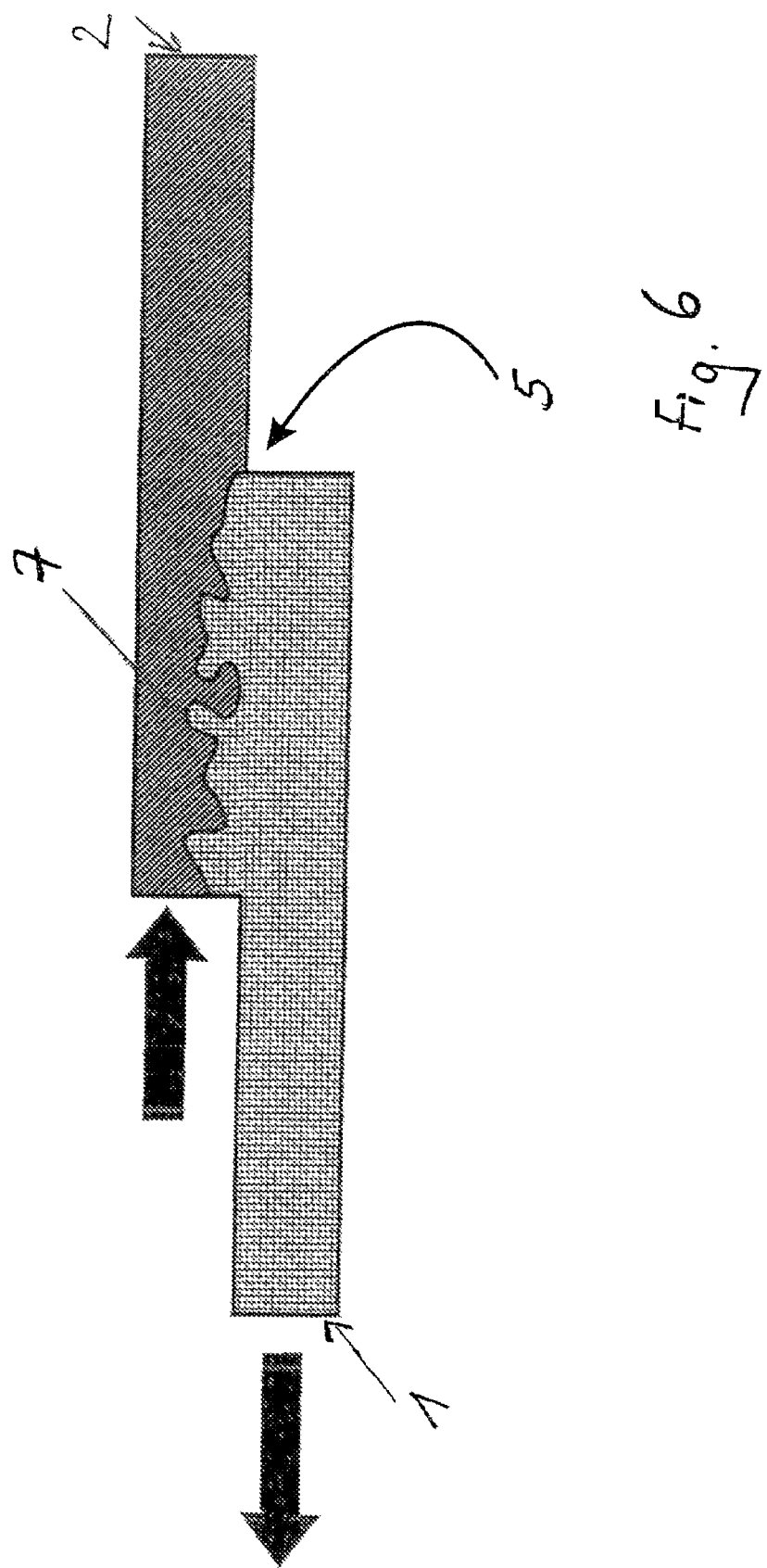
FIG. 6 shows the cured component produced according to the method of FIGS. 1 to 5.

A further increase in temperature in the arrangement according to FIG. 5 has the effect that the injected thermosetting binder is cured. Subsequent cooling of the arrangement, preferably within the mold 6, has the effect that the thermoplastic binder of the first partial element 1 is also cured, so that, after removal from the mold 6, a fiber composite component represented in FIG. 6 is obtained, said component having matrix systems of the two partial elements 1, 2 intermeshed with one another at its boundary surface 5, and consequently has a high resistance to shearing loads schematically indicated in FIG. 6 by arrows.

Figure 7:
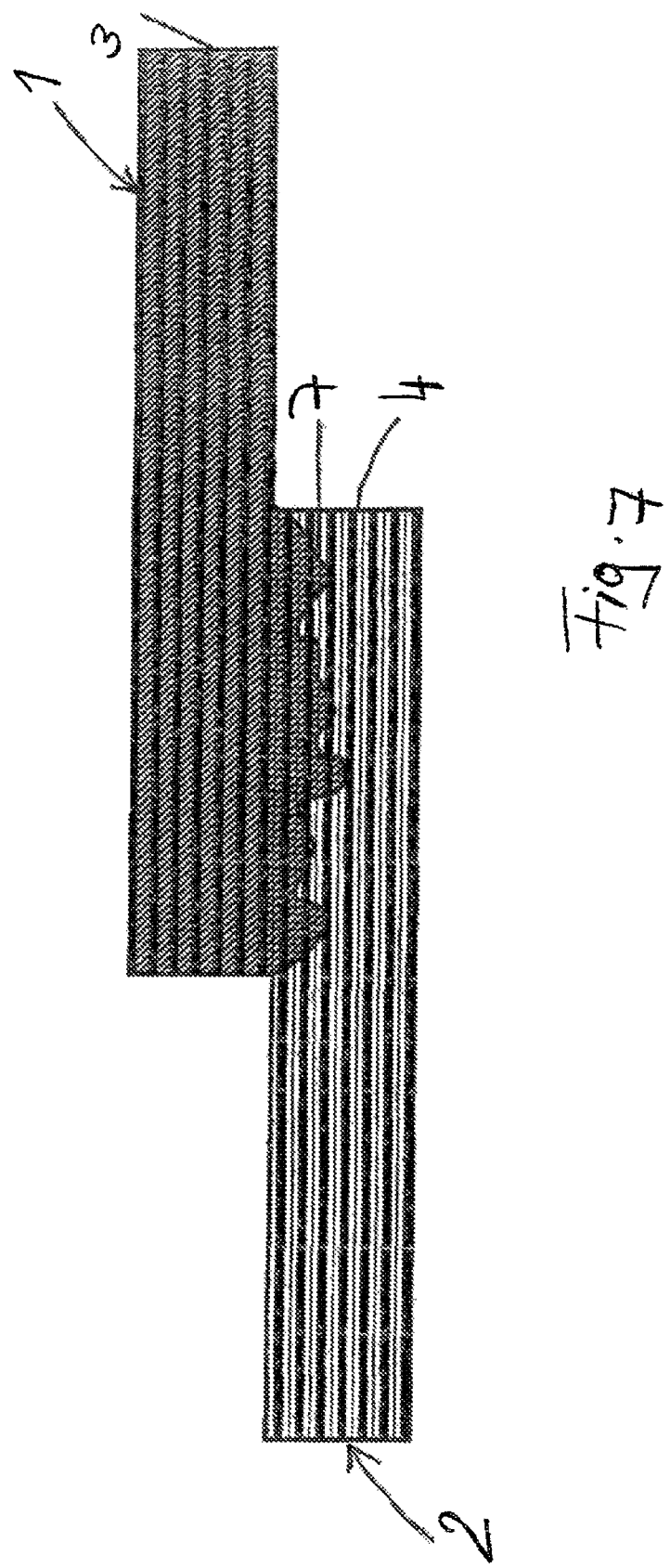
FIG. 7 shows a method step for the production of a component according to a further embodiment of the invention with the formation of a mixing zone.
Figure 8:
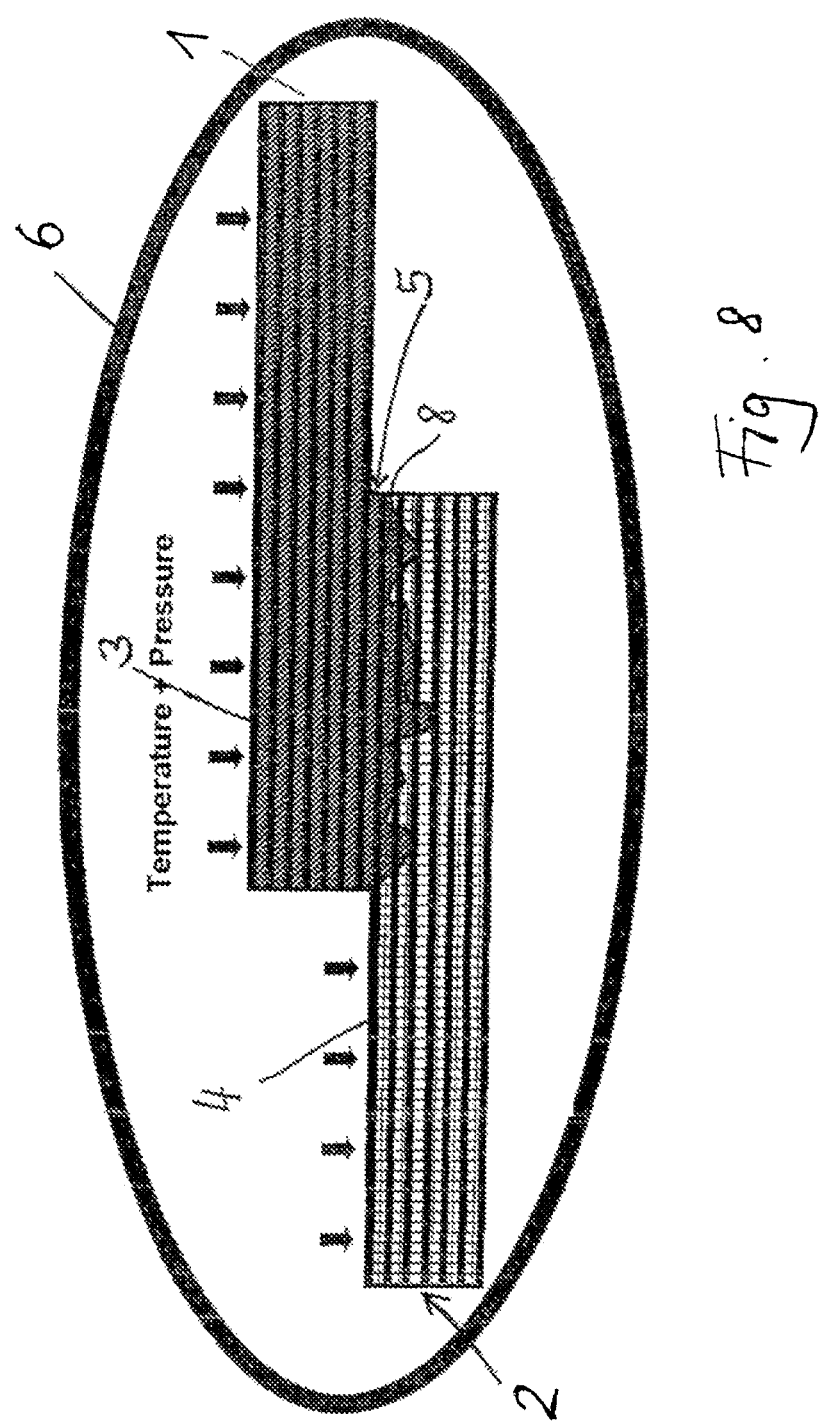
FIG. 8 shows a schematic for producing the cured component.
Figure 9:
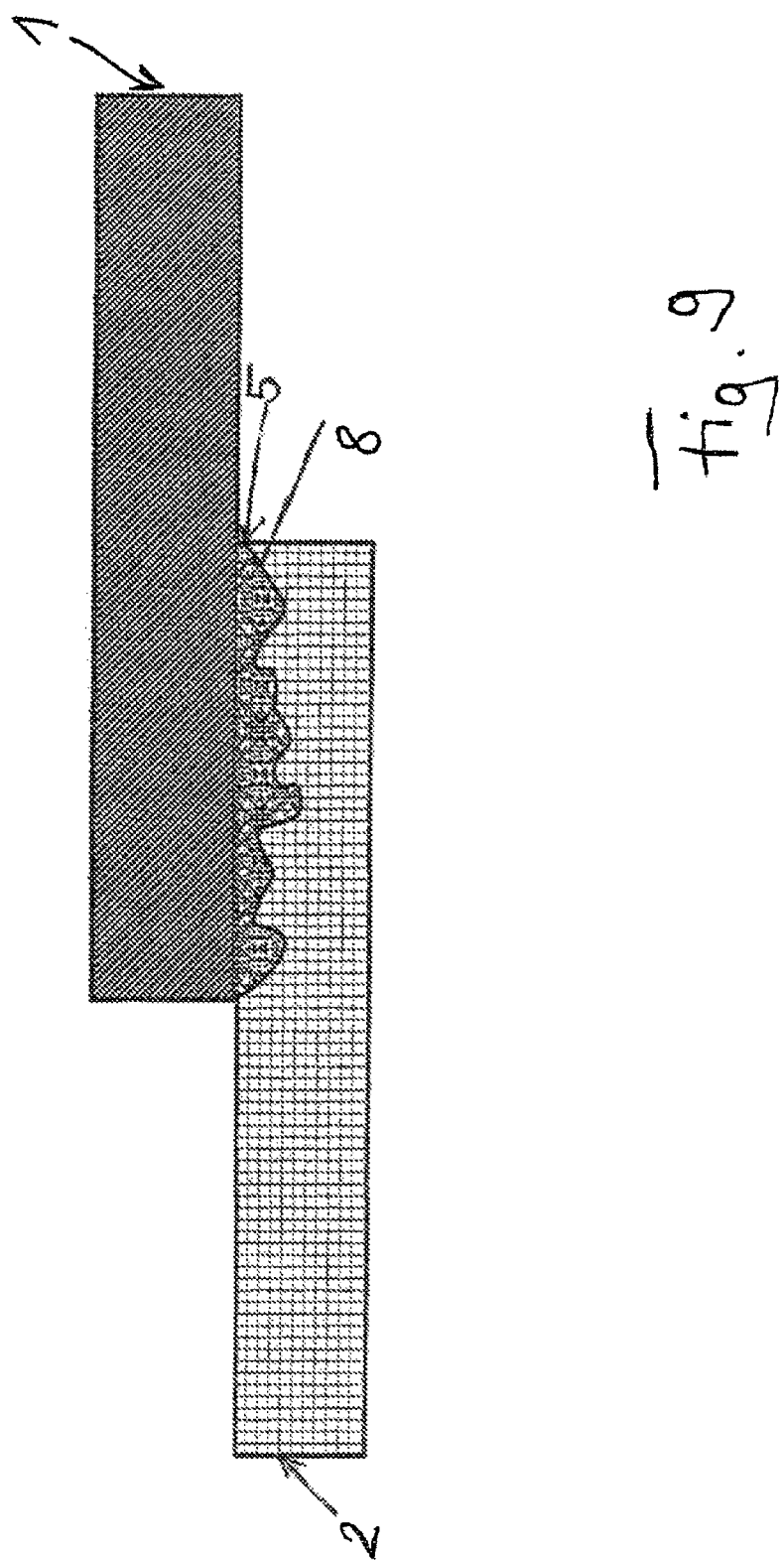
FIG. 9 shows the cured component according to FIG. 8'.

In the exemplary embodiment represented in FIGS. 7 to 9, the first partial element 1 has a fiber structure 3, which in the form of a prepreg is coated to excess with a thermosetting plastic, so that, when the temperature in a mold or an autoclave 6 is increased, the thermosetting material penetrates irregularly in the region of the second partial element 2 and the irregular boundary line 7 forms. The fiber structure 4 of the second partial element may, for example, be mixed with thermoplastic fibers as a comingling hybrid. When the temperature is increased, the thermosetting material begins to cure, whereas the thermoplastic fibers begin to melt. As a result, the thermoplastic composite material forms in the second partial element. After cooling and curing of the component, an irregular mixing region 8 consisting of cured thermosetting material with likewise cured thermoplastic inclusions has formed in the region of the second partial element 2. Once again, the improvement in the stability of the boundary layer 5 between the partial elements 1, 2 is brought about by the mechanically irregularly formed boundary line 7 of the mixing region 8 in the second partial element 2.

It goes without saying that the exemplary embodiments represented are not intended to be restrictive in terms of protection. Within the scope of the invention, different binders, which are both thermosetting or both thermoplastic, may be used in neighboring partial elements 1, 2. Furthermore, it is not necessary to use a comingling hybrid, since prepregs or dry fiber structures into which the corresponding matrix material is injected can be used in the same way.

Furthermore, it is possible to allow the binder of the first partial element 1 already to cure after liquefaction before the binder of the second partial element 2 is activated by liquefaction or injection. In all cases, the desired mechanical intermeshing of the matrix systems of the two partial elements 1, 2 according to the invention can be realized in the second partial element 2.

FIGS. 10a) to f) show the various method steps for the production of a fiber composite component comprising two partial elements bordering one another.

FIG. 10a) shows a cross-sectional view of a first partial element 101 comprising a fiber structure 102 and a matrix system 103 embedded in the fiber structure 102.

As can be seen from FIG. 10b), the matrix system 103 of the first partial element 101 is liquefied by temperature and pressure, in order to consolidate the first partial element 101 subsequently by curing of the matrix material 103. The fact that the fiber structure 102 is wetted by matrix system 103 in a transitional region 104 of the first partial element 101 has the effect that the matrix system 103 only penetrates incompletely into the transitional region 104, i.e. into the matrix-free transitional region 104, during the consolidation. After curing, a transitional region 104 with an irregular thickness distribution over the surface area of the transitional region 104 is created, as can be seen from FIG. 10c).

In a next step, which is outlined in FIG. 10d), the separately consolidated first partial element 101 is laid in a sheet-like manner onto a second partial element 105. Subsequently, a matrix system (injection resin) 106 is injected into the second partial element 105 and temperature and pressure are used to make the matrix system 106 of the second partial element 105 flow through the latter into the transitional region 104 of the first partial element. There, the matrix system 106 interlocks or meshes with the transitional region and is cured (FIGS. 10e) and f)).

It is consequently provided that the matrix system 103 of the first partial element 101 is liquefied and, on account of its high viscosity, penetrates the transitional region 104 of the first partial element 101 incompletely, so that an irregular boundary layer forms during the curing of the matrix system 103. The matrix system 106 of the second partial element 105 is not yet present during the curing of the first partial element 101, or the matrix system 103 of the first partial element is liquefied and cured without the presence of the second partial element 105. Subsequently, the matrix system 106 is injected into the second partial element 105 or a matrix system 106 already contained in the second partial element 106 is heated. As a result, the matrix system 106 of the second partial element 105 penetrates into the transitional region 104 of the first partial element 101, which has not yet been wetted with the matrix system 106. As a result, the matrix system of the second partial element 105 flows up to the boundary layer of the first matrix system 103, interlocks or meshes with it and is cured.

FIG. 11 shows a second embodiment of the first partial element 101, which is made up of two layers 107a, 107b. The first layer 107a comprises a thermoplastic comingling hybrid, which is joined to the second layer 107b. The second layer 107b may comprise one or more dry fiber layers, or fiber layers without a matrix system. The joining of the first and second layers 107a, 107b to one another may be performed for example by sewing. During the liquefaction of the thermoplastic material contained in the first layer 107a, this material flows partly into the second layer 107b, so that a boundary layer forms in the second layer 107b as a transitional region 104 during the curing of the thermoplastic material as a matrix system.

For this purpose, as shown in FIG. 12a), the first partial element 101, formed by the two layers 107a, 107b, is consolidated with the aid of temperature and pressure. FIG. 12b) shows the completely consolidated first partial element 101 with the transitional region 104.

A third embodiment of the first partial element 101, outlined in FIG. 13, is likewise made up of two layers 108a, 108b. Once again, the first layer 108a comprises a thermoplastic comingling hybrid or a thermoplastic prepreg. The second layer 108b comprises a number of fiber layers sewn to one another, a laid fiber fabric or a preform fiber layer.

Before the melting of the thermoplastic material in the first layer 108a, the second layer 108b is brought into contact with the first layer 108a. Subsequently, as outlined in FIG. 14a), the thermoplastic material of the first layer 108a is liquefied by temperature and pressure and begins to flow into the second layer 108b. As a result, a boundary layer forms in the second layer 108b during the curing of the thermoplastic material, said boundary layer once again creeping a transitional region 104 with irregular thickness distribution.

FIG. 15 shows a fourth embodiment of the first partial element 101, in the case of which a punched or perforated thermoplastic film 110 is laid between the first and second layers 109a, 109b before the consolidation of the thermoplastic material contained in the first layer 109a as a matrix system.

During the consolidation of the first partial element 101, outlined in FIG. 16a), by temperature and pressure, the thermoplastic film 110 begins to melt and flows partly into the second layer 109b. During the curing of the first partial element 101, consequently the two layers 109a, 109b are bonded to one another. Furthermore, the perforation of the thermoplastic film 110 is preserved to the greatest extent in the second layer 109b and a boundary layer with holes is formed. This is outlined in FIG. 17b). The transitional region 104 having corresponding holes can be seen there. The matrix system of the second partial element 105 can then flow into these holes of the transitional region 104 and additionally mesh with the matrix system of the first partial element 101, or create a highly uneven boundary surface, during curing.

FIGS. 17a) to c) show the application of the method described above for the production of stringer-stiffened fuselage or wing shells for aircraft. The first partial element 101 is, for example, a stringer produced from carbon-fiber material with a thermoplastic matrix that is completely consolidated on the stringer foot with respect to the shell element as the second partial element 105 with the exception of the transitional region 104. The stringers may also be finely adapted to contours of the shell, i.e. of the second partial element 105, for example spherical contours, by hot working.

The shell elements, i.e. the second partial element 105, are/is laid for example from an epoxy/carbon-fiber prepreg. During the heating up of the sealed shell component, i.e. the second partial element 105, with the stringers, i.e. the first partial element 101, the still dry region of the stringer feet is impregnated with excess resin of the prepreg and so forms a load-bearing connection of the stringers to the shell. This is outlined in FIGS. 17b) and c).

The invention claimed is:

1. A method for producing a fiber composite component comprising first and second partial elements bordering one another, the first partial element having a fiber structure and a first matrix system embedding the first fiber structure, the second partial element having a second fiber structure and a second matrix system embedding the second fiber structure, said first matrix system and said second matrix system having different curing mechanisms, comprising the steps of:
consolidating the first matrix system within the first fiber structure of the first partial element leaving a transitional region of the first fiber structure adjacent to the second fiber structure of the second partial element without the first matrix system;
allowing the second matrix system of the second fiber structure to penetrate in its liquid state into the transitional region of the first partial element; and then
consolidating the second matrix system within the second fiber structure of the second partial element and in the transitional region of the first partial element.

2. The method as claimed in claim 1, wherein at least one of the step of consolidating the first matrix system or the step of consolidating the second matrix system is performed by liquefying and subsequent curing of the respective matrix system.

3. The method as claimed in claim 1, wherein at least one of the step of consolidating the first matrix system or the step of consolidating the second matrix system is performed by injection and subsequent curing of the respective matrix system.

4. The method as claimed in claim 1, wherein the transitional region is formed with an irregular thickness distribution over a surface area of the transitional region.

5. The method as claimed in claim 1, further comprising the step of making the first partial element from at least two layers which are joined to one another, a first layer of said at least two layers being a fiber structure which is provided with said first matrix system and a second layer of said at least two layers being a fiber structure which is joined to the first layer and which is not provided with said first matrix system wherein said second layer forms the transitional region.

6. The method as claimed in claim 5, wherein a thermoplastic commingling hybrid or a thermoplastic prepreg is used as the first layer.

7. The method as claimed in claim 5, wherein said step of making the first partial element includes sewing fiber structures of said at least two layers to one another.

8. The method as claimed in claim 5, wherein the second layer is formed by fiber layers sewn to one another, by a laid fiber fabric, or by a preform fiber layer, and wherein the step of making the first partial element includes applying the second layer to the first layer and consolidating the first matrix system of the first partial element while leaving the transitional region.

9. The method as claimed in claim 5, wherein said first matrix system is a thermoplastic, and wherein the step of making the first partial element includes liquefying said thermoplastic of the first matrix system of the first layer and curing the first matrix system after it has partially penetrated into the second layer during said liquefying step.

10. The method as claimed in claim 5, wherein the step of making the first partial element includes laying at least one thermoplastic film between the first and second layers of the first partial element before consolidation of the first matrix system of the first partial element, and curing of the first matrix system by means of introducing heat in a manner whereby the thermoplastic film melts and penetrates partially into the second layer to form an uneven transitional region.

11. The method as claimed in claim 10, wherein the thermoplastic film is punched or perforated.

* * * * *